US006405584B1

(12) United States Patent
Bindell et al.

(10) Patent No.: US 6,405,584 B1
(45) Date of Patent: Jun. 18, 2002

(54) PROBE FOR SCANNING PROBE MICROSCOPY AND RELATED METHODS

(75) Inventors: Jeffrey Bruce Bindell; Erik Cho Houge, both of Orlando; Larry E. Plew, St. Cloud; Terri Lynn Shofner, Casselberry; Fred Anthony Stevie, Orlando, all of FL (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/412,130

(22) Filed: Oct. 5, 1999

(51) Int. Cl.7 .............................. G01B 5/28; G01B 7/34
(52) U.S. Cl. ..................... 73/105; 250/306; 250/307
(58) Field of Search ......................... 73/105; 250/306, 250/307

(56) References Cited

U.S. PATENT DOCUMENTS

| 5,021,364 A | * | 6/1991 | Akamine et al. | ............ 150/306 |
| 5,307,693 A | | 5/1994 | Griffith et al. | ................. 73/105 |
| 5,356,218 A | * | 10/1994 | Hopson et al. | .............. 250/306 |
| 5,859,364 A | * | 1/1999 | Toda et al. | .................... 73/105 |
| 5,877,412 A | * | 3/1999 | Muramatsu et al. | .......... 73/105 |
| 5,939,623 A | * | 8/1999 | Muramatsu et al. | .......... 73/105 |
| 5,955,661 A | | 9/1999 | Samsavar et al. | .............. 73/105 |
| 5,992,225 A | * | 11/1999 | Shirakawabe et al. | ........ 73/105 |
| 6,104,030 A | * | 8/2000 | Chiba et al. | ................. 250/306 |
| 6,246,054 B1 | * | 6/2001 | Toda et al. | .................. 250/306 |

OTHER PUBLICATIONS

Bindell et al., "Stylus Nanoprofilometry: A New Approach to CD Metrology", Solid State Technology, Sep. 30, 1999, pp. 1–7.

* cited by examiner

Primary Examiner—Daniel S. Larkin

(57) ABSTRACT

A scanning probe microscope includes a sensor head adjacent a stage for holding a sample, a scanning actuator for positioning the sensor head relative to the sample, and a probe carried by the sensor head. The probe preferably includes a base connected to the sensor head, a shank extending from the base at an angle offset from perpendicular to the base, and a tip connected to a distal end of the shank for contacting the sample. The angle is preferably in a range of 5 to 20°. The tip is preferably laterally offset from the base to permit viewing of the tip without interference from the shank and the base. Thus, the location of the probe tip relative to the sample may be more easily determined.

43 Claims, 2 Drawing Sheets

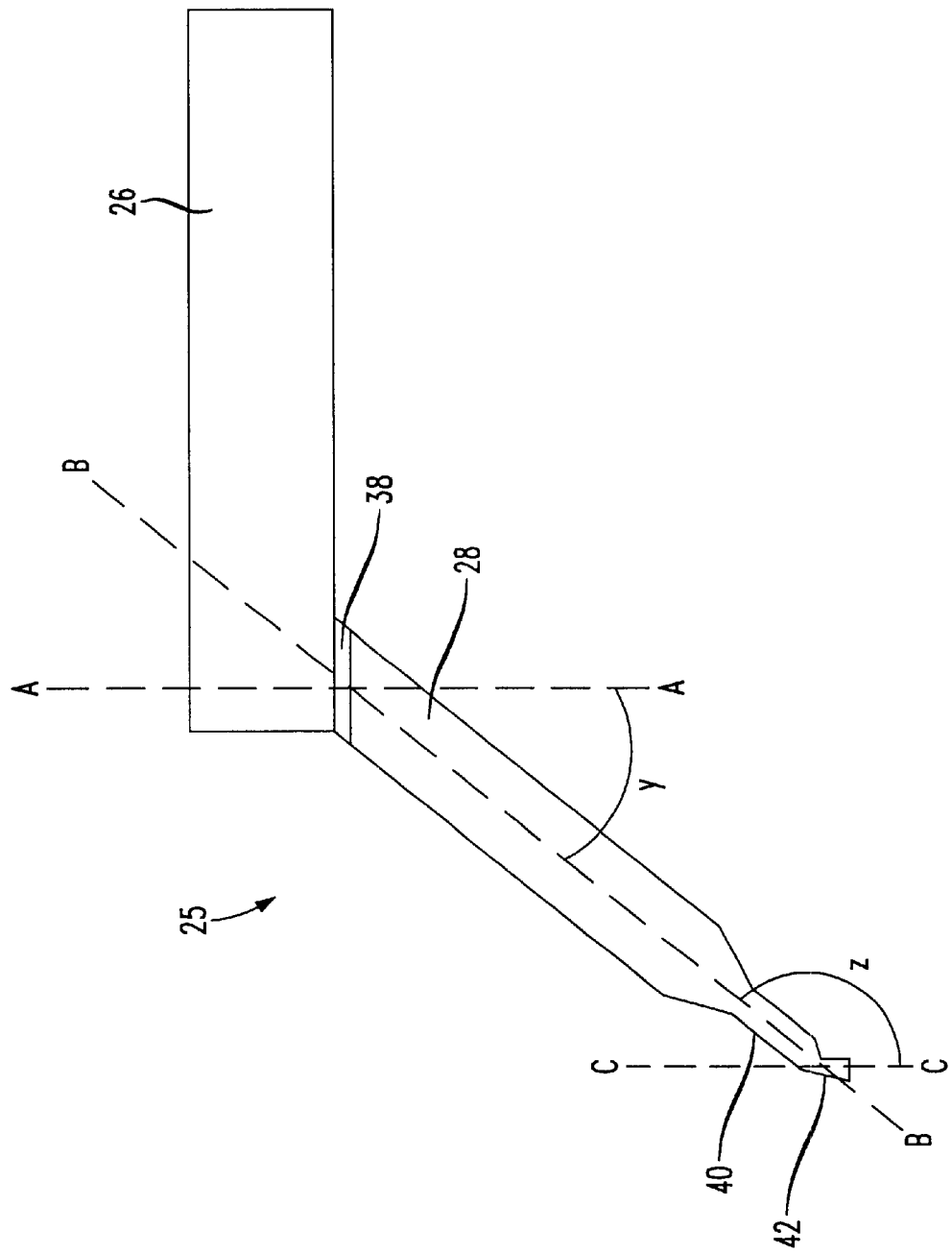

PROBE FOR SCANNING PROBE MICROSCOPY AND RELATED METHODS

FIELD OF THE INVENTION

The present invention relates to the field of metrology, and, more particularly, to scanning probe microscopy.

BACKGROUND OF THE INVENTION

Scanning probe microscopes (SPM) utilize a very fine probe having a tip which is maintained either just touching or very close to the surface of a sample. The probe is mounted to a scan head and the sample is mounted to a table, with the scan head and table being arranged for three-dimensional relative movement therebetween. To obtain an accurate profile of a feature on the nano-scale, the sample surface cannot be altered by the measurement and the probe tip or stylus shape must be known and cannot change during the measurement.

Stylus NanoProfilometry (SNP) technology addresses identified shortcomings of cantilever-based atomic force microscopy (AFM) instruments, namely the constantly changing geometrical relationship between the tip and the sample, tip wear, accretion of contamination, and constantly varying tip-to-sample geometry. An example of a stylus nanoprofilometer is the S/II offered by Surface/Interface, Inc. of Sunnyvale, California. SNP achieves control by using characterized tip shapes with on-board tip characterizers, controlling the force of the sample tip interaction and the orientation of the tip with respect to the sample plane, and interacting with the surface only once for each data point obtained (pixel-only sampling). SNP uses computer algorithms to calculate the sample profile from the scan output by accounting for the contribution of the tip shape to the raw data.

As it is implemented in a metrology tool, SNP combines traditional scanning probe microscopy and stylus profilometry with automatic tip characterization and new force-controlled and angle-controlled sensing technologies (i.e., controlled-force contact and angle-controlled contact), adding new capabilities to submicron and deep submicron critical dimension (CD) metrology for semiconductor wafers and masks. This nondestructive technique obtains and displays profiles of lines, trenches, and other features and quantitatively characterizes critical sidewall parameters such as slope and profile shape at top and bottom corners without cross-sectioning.

SNP profiles can be obtained at multiple locations along a line or in a trench, adding statistics to CD measurements and information on line-edge roughness. SNP can also be a calibration partner for CD scanning electron microscopes (CD-SEMs), replacing the physical cross-sectioning procedure required to check CD-SEM measurements. Compared to SEM imaging of a line or trench's physical cross-section, SNP turnaround time is short since measurements can be done in a wafer fabrication plant instead of an off-line analytical lab. SNP technology allows for multiple, sequential scans to produce data used to build detailed images along a feature or line. An additional benefit of SNP is that multiple profiles can be taken along a line or trench to see nanoscale detail that could have significant process ramifications.

Because the tip geometry needs to be subtracted from measurement data to determine the true profile of the measured structure, all aspects of the tip-to-sample interaction must be fully characterized and controlled. Any changes to tip geometry from wear dramatically affects the final results. Damage or accretion of contamination on the scale of a few nanometers will significantly degrade the final profile obtained. It is also critical to have accurate measurement and control of the force between the tip and the measured structure, even when the force is attractive. In contrast to a cantilever AFM, in which the probe tip continuously scans and touches (or nearly touches) the measurement point, SNP uses a step-and-repeat measurement sequence. The SNP probe touches only at each pixel, then the tip is pulled away from the sample between measurements, thereby lowering the risk of tip and sample damage.

An SNP measurement system includes a force sensor comprising a compact (10×5 mm) silicon balance beam probe assembly with an attached probe and tip with integral capacitive sensors for force and location detection such as described in U.S. Pat. No. 5,307,693 to Griffith et al. entitled "Force-sensing system, including a magnetically mounted rocking element." The probe is an etched glass fiber mounted on a glass tab using an epoxy. The assembly is held in position by a base-plate magnet and pivots on a pair of precision ball bearings. The assembly is positioned by a piezoceramic scan actuator attached to its base. Position is sensed in x, y, and z axes by three sets of capacitance sensors. This configuration allows the balance beam assembly to be moved quickly and easily, either manually or by an automated probe exchanger. Electronic control keeps the beam in balance, maintaining tip orientation within 0.1° during the measurement scan. Data from the capacitive sensors are fed back to eliminate hysteresis, nonlinearity, and drift, which are characteristic of piezoceramic scanners. The x, y, and z data are combined to define the measured surface profile.

During a measurement, with the balance beam balanced by voltages on the capacitor plates, the probe tip senses the sample surface. When the force that the sample surface exerts on the probe tip upsets the balance (typical force sensitivity <50 nN), the voltage is changed on the balance capacitor to re-establish beam balance. This re-balancing voltage is directly proportional to the force sensed by the probe. Beam balance is maintained so that the geometrical relationship between the tip and the sample surface stays the same, including the tip's angle of contact. The motion is such that the tip always contacts the sample surface at a constant angle relative to the plane of the balance beam. This contact angle is determined by the tilt of the sample and is typically 90°.

There is no practical all-purpose probe shape optimal for all types of surface features, so SNP is optimum when equipped with an onboard library of characterized tips for different applications. For example, the measurement of a deep feature diameter at both the bottom and top of a sidewall is best done with a cylindrical high-aspect-ratio tip. A straight-sided tip is most often used as it makes it easy to subtract the tip contour from the raw data. Typical dimensions for probes are 100–250 nm in diameter, with an overall length of 300–1500 nm. Probes are fabricated separately from the sensor, which allows for maximum flexibility of probe and tip material and shape. Automated probe assembly exchange is facilitated by the relatively large size of the balance beam assembly and the simple magnetic attachment to the scanning probe assembly.

As with any SPM, one difficulty is in the determination of the location of the probe tip's apex point and proximal point with respect to the sample surface. For cantilever based AFMs, the determination is difficult because the substrate blocks the view of the exact location of the tip. In the SNP, the use of a glass fiber as the probe allows the determination of the tip location by slight levels of light refraction on the sample surface. While this helps in locating the tip, it is still difficult to determine where the tip is located and can take a long time or require the use of a complicated process due to the orientation of the glass fiber with respect to the silicon plate. Furthermore, once the probe tip location is found, it becomes difficult to then image the sample surface as the light from the long working distance microscope has to propagate through the glass tab, epoxy, and the length of the fiber.

SUMMARY OF THE INVENTION

In view of the foregoing background, it is therefore an object of the invention to improve the determination of the location of the probe tip for scanning probe microscopy.

It is another object of the present invention to provide a probe tip which allows the location of the probe tip to be more easily determined.

These and other objects, features, and advantages in accordance with the present invention are provided by a scanning probe microscope including a sensor head adjacent a stage for holding a sample, a scanning actuator for positioning the sensor head relative to the sample, and a probe carried by the sensor head. The probe preferably comprises a base connected to the sensor head, a shank extending from the base at an angle offset from perpendicular to the base, and a tip connected to a distal end of the shank for contacting the sample. The angle is preferably in a range of 5 to 20°. The tip is preferably laterally offset from the base to permit viewing of the tip location without interference from the shank and the base. Thus, the location of the probe tip may be more easily determined.

Preferably, the shank and the tip are integrally formed as a monolithic unit and comprise an optical fiber. Also, the tip preferably extends from the distal end of the shank at an angle offset from an axis of the shank, and/or extends from the distal end of the shank in a direction generally parallel to an imaginary line extending perpendicularly from the base. An adhesive may secure the shank to the base, the tip has a reduced diameter relative to the shank, and the base preferably comprises a glass plate. Furthermore, the scanning probe microscope may include an optical viewer for viewing a tip location from above.

The objects, features, and advantages in accordance with the present invention are also provided by a method of making the probe including the steps of forming a probe shank and connecting the probe shank to a base to be connected to the scanning probe microscope, and forming a tip at a distal end of the probe shank for contacting the sample. The tip extends from the probe shank at an angle offset from an axis of the probe shank. Forming the tip preferably comprises chemically etching the probe shank and/or etching the probe shank with a focused ion beam (FIB).

The objects, features, and advantages in accordance with the present invention are also provided by a method of scanning a sample with a scanning probe microscope. The method includes the steps of mounting a probe to the scanning probe microscope, positioning the probe relative to the sample while viewing a tip location from above, and measuring the sample with the probe. The probe preferably comprises a base connected to the scanning probe microscope, a shank extending from the base at an angle offset from perpendicular to the base, and a tip connected to a distal end of the shank for contacting the sample. The tip is preferably laterally offset from the base to permit viewing of a location of the tip without interference from the shank and the base.

BRIEF DESCRIPTION OF THE DRAWINGS

FIG. 2 is an enlarged schematic view of the probe and base from the scanning probe microscope of FIG.1.

DETAILED DESCRIPTION OF THE PREFERRED EMBODIMENTS

Figure 1:
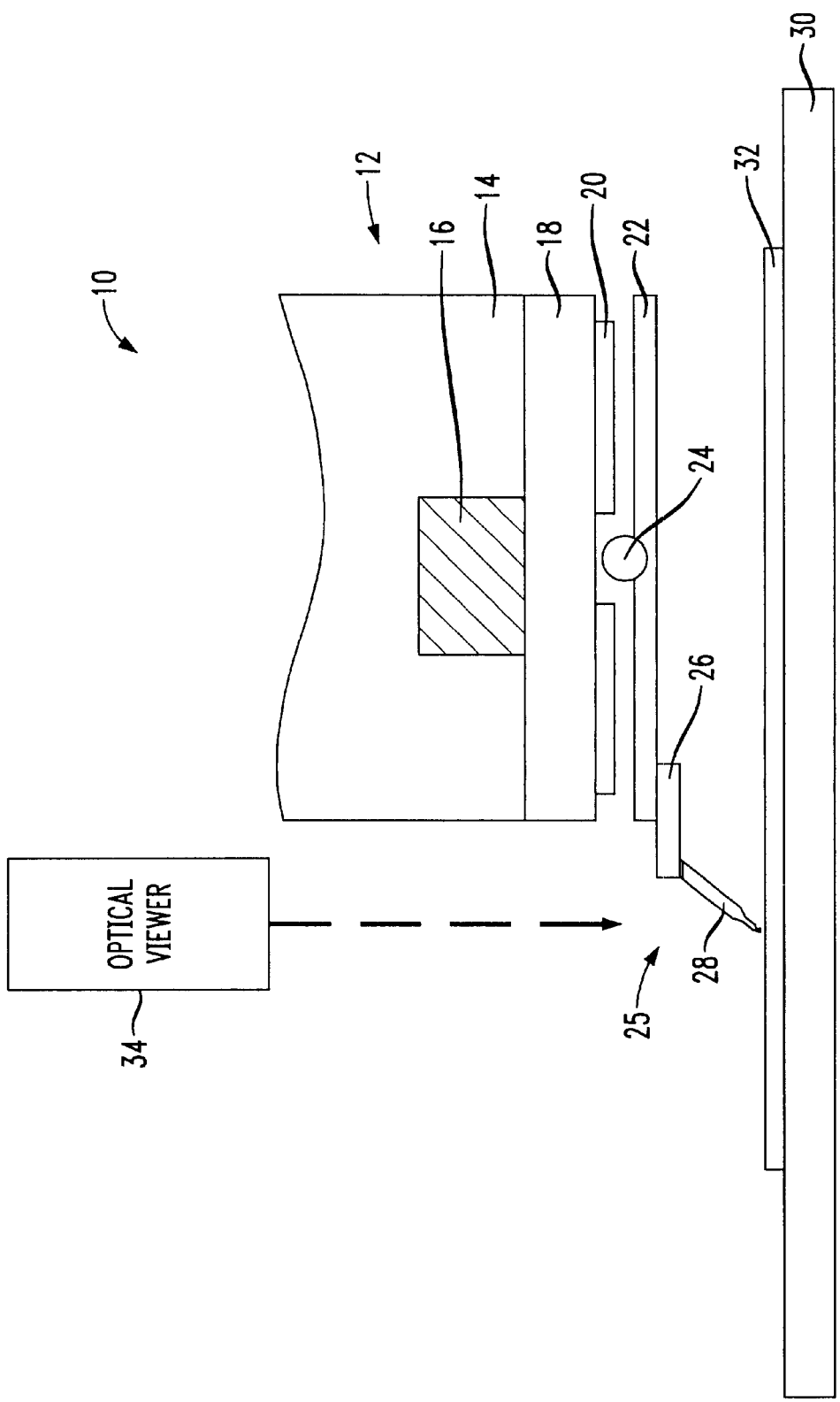
FIG. 1 is a schematic view of a scanning probe microscope including an offset probe in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. The dimensions of layers and regions may be exaggerated in the figures for greater clarity.

Referring to FIG. 1, a scanning probe microscope 10 in accordance with the present invention will now be described. As illustrated, the scanning probe microscope 10 is a stylus nanoprofilometer (SNP), also know as a critical dimension atomic force microscope (CDAFM). The SNP 10 includes a sensor head 12 adjacent a stage 30 for holding a sample 32. The SNP also includes a scanning actuator 14 for positioning the sensor head 12 relative to the sample 32. Here, the sensor head 12 includes a magnet 16, body portion 18, and capacitors 20 mounted on the body portion.

A balance beam 22 is held to the sensor head 12 by ball bearings 24 and the magnet 16. The balance beam 22 is preferably a 10 mm×5 mm silicon plate. The ball bearings are attached to opposing edges of the balance beam 22 and serve as a pivot while the capacitors 20 on either side of the pivot balance the balance beam 22 by a variable electric field controlled by a force-balance servo (not shown) as would be appreciated by the skilled artisan. As shown in FIG. 1, the SNP 10 may include an optical viewer 34 for viewing the location of the tip 42 from above. The optical viewer 34 may be, for example, a long working distance microscope or an inline microscope.

A probe 25 is carried by the sensor head 12 and includes a base 26 connected to the sensor head, and a shank 28 extending from the base. The base 26 is typically a glass plate or tab, and an adhesive 38 may secure the shank 28 to the base. The adhesive is typically, for example, a UV cured epoxy. Referring now to FIG. 2, the details of the probe 25 will now be described. The probe 25 includes a tip 42 connected to a distal end 40 of the shank 28 for contacting the sample 32. The tip 42 and the distal end 40 have a reduced diameter relative to the shank 28. The shank 28 extends from the base 26 at an angle y offset from perpendicular to the base. The angle y, illustrated between an imaginary line A—A perpendicular to the base 26 and the axis B—B of the shank 28, is preferably in a range of 5 to 20°. Thus, the tip 42 is laterally offset from the base 26 to permit viewing of a tip location without interference from the shank 28 and the base 26. Thus, the location of the probe tip 42 may be more easily determined.

Preferably, the shank 28 and the tip 42 are integrally formed as a monolithic unit and comprise an etched optical fiber. The optical fiber is preferably, for example, a pure silica core fiber surrounded by fluorine doped cladding. Also, the tip 42 preferably extends from the distal end 40 of the shank 28 at an angle z offset from the axis B—B of the shank. The angle z is preferably between 160 to 175°. As such, the tip 42 extends from the distal end 40 of the shank 28 in a direction C—C generally parallel to the imaginary line A—A extending perpendicularly from the base 26, as shown in FIG. 2. If the shank 28 is inclined, i.e. at an angle y greater than 0°, then the tip 42 will be exposed from the shank 28, base 26 and the sensor head 12. This will allow visualization of the tip 42 location relative to the sample 32 via the optical viewer 34 because the sample will not be distorted or entirely blocked by the adhesive 38 and the shank 28. The probe tip 42 allows the location of the tip 42 to be more easily determined.

A method of making the probe 25 includes forming the probe shank 28 and connecting the probe shank to the base 26. Of course the base 26 is connectable to the balance beam 22 of the scanning probe microscope 10. The tip 42 is formed at a distal end 40 of the shank 28 for contacting the sample. As discussed above, the tip 42 extends from the shank 28 at an angle z offset from an axis B—B of the shank 28.

The initial diameter of an optical fiber, e.g. 125 micrometers, is etched down to an intermediate diameter by a wet chemical etch, such as described by H. M. Marchman (Rev. Sci. Instrum. 65 (8), August 1994). The radial etch rate may be modified by using different concentrations of active acid to dilution coefficients. The intermediate diameter may vary as the final cutting of the optical fiber will be made with a focused ion beam (FIB). For example, the length of the shank may be 1.4 mm and the intermediate diameter of the distal end 40 of the shank 28 may be one micrometer but could vary from approximately four hundred nanometers to two thousand nanometers. Also, as discussed above, the optical fiber may be a pure silica core fiber but may also be a material that would yield a higher Young's Modulus, such as, for example, sapphire.

Once the intermediate etch target is reached, the optical fiber forming the shank 28 is mounted onto the base 26 or glass tab with an adhesive 38, such as a UV cured epoxy. Preferably, this is when the angle y between the shank 28 and the base 26 (or balance beam 22) is introduced. The morphology of the shank 28 dictates the angular offset z to extend the tip 42 from the distal end 40 of the shank 28. An offset angle y of approximately 5° extends the tip 42 beyond the interference of the adhesive 38, and an offset angle of 20° extends the tip 42 beyond the interference of the adhesive 38 and the shank 28.

The probe 25 connected to the balance beam 22 is then mounted in relation to the FIB using an alignment jig that allows the probe to be mounted vertically with respect to the FIB, as would be appreciated by those skilled in the art. The tip 42 morphology, such as, for example, cylindrical, conical, or diamond shaped, is then cut into the distal end 40. Thus, when the probe 25 is used during scanning, light used in the optical viewer 34 to visualize the tip 42 location and the sample 32 surface does not have to propagate through the adhesive 38 or down the entire length of the shank 28.

Accordingly, a sample 32 can be measured with the scanning probe microscope 10 including the probe 25 in accordance with the present invention. The probe 25 is mounted to the scanning probe microscope 10 and positioned relative to the sample 32 while viewing a tip 42 location from above with the optical viewer 34. The sample 32 surface is then measured with the probe 25. The determination of the location of the probe tip 42 for scanning probe microscopy is improved in accordance with the present invention.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A scanning probe microscope comprising:
   a stage for holding a sample;
   a sensor head adjacent the stage;
   a scanning actuator for positioning the sensor head relative to the sample; and
   a probe carried by the sensor head and comprising
      a base connected to the sensor head,
      a shank extending from the base at an angle offset from perpendicular to the base, and
      a tip connected to a distal end of the shank, and integrally formed as a monolithic unit therewith, for contacting the sample, the tip being laterally offset from the base to permit viewing of a tip location without interference from the shank and the base, the shank and the tip comprising an optical fiber.

2. A scanning probe microscope according to claim 1, wherein the tip extends from the distal end of the shank at an angle offset from an axis of the shank.

3. A scanning probe microscope according to claim 1, wherein the tip extends from the distal end of the shank in a direction generally parallel to an imaginary line extending perpendicularly from the base.

4. A scanning probe microscope according to claim 1, wherein the angle is in a range of 5 to 20°.

5. A scanning probe microscope according to claim 1, further comprising an adhesive securing the shank to the base.

6. A scanning probe microscope according to claim 1, wherein the tip has a reduced diameter relative to the shank.

7. A scanning probe microscope according to claim 1, wherein the sensor head comprises an atomic force sensor head.

8. A scanning probe microscope according to claim 1, wherein the sensor head comprises a profilometer sensor head.

9. A scanning probe microscope according to claim 1, further comprising an optical viewer for viewing the tip location from above.

10. A probe for a scanning probe microscope of a type comprising a sensing head, the probe comprising:
    a base, comprising a glass plate, for connection to the sensor head;
    a shank extending from the base at an angle offset from perpendicular to the base; and
    a tip connected to a distal end of the shank, and integrally formed as a monolithic unit therewith, for contacting the sample, the tip being laterally offset from the base.

11. A probe for a scanning probe microscope according to claim 1, wherein the shank and the tip comprise an optical fiber.

12. A probe for a scanning probe microscope according to claim 10, wherein the tip extends from the distal end of the shank at an angle offset from an axis of the shank.

13. A probe for a scanning probe microscope according to claim 10, wherein the tip extends from the distal end of the shank in a direction generally parallel to an imaginary line extending perpendicularly from the base.

14. A probe for a scanning probe microscope according to claim 10, wherein the angle is in a range of 5 to 20°.

15. A probe for a scanning probe microscope according to claim 10, further comprising an adhesive securing the shank to the base.

16. A probe for a scanning probe microscope according to claim 10, wherein the tip has a reduced diameter relative to the shank.

17. A probe for a scanning probe microscope of a type comprising a sensing head, the probe comprising:
   a base to be connected to the sensing head;
   a shank extending from the base; and
   a tip connected to a distal end of the shank for contacting the sample, the tip extending from the shank at an angle offset from an axis of the shank, the shank and the tip being integrally formed as a monolithic unit and comprising an optical fiber.

18. A probe for a scanning probe microscope according to claim 17, wherein the tip extends from the distal end of the shank in a direction generally parallel to an imaginary line extending perpendicularly from the base.

19. A probe for a scanning probe microscope according to claim 17, wherein the angle is in a range of 160–175°.

20. A probe for a scanning probe microscope according to claim 17, further comprising an adhesive securing the shank to the base.

21. A probe for a scanning probe microscope according to claim 17, wherein the tip has a reduced diameter relative to the shank.

22. A probe for a scanning probe microscope according to claim 17, wherein the base comprises a glass plate.

23. A method of making a probe for a scanning probe microscope, the method comprising the steps of:
   providing a base to be connected to the scanning probe microscope;
   forming a probe shank and connecting the probe shank to the base; and
   forming a tip at a distal end of the probe shank for contacting the sample, the tip extending from the probe shank at an angle offset from an axis of the probe shank;
   the shank and the tip being formed from an optical fiber.

24. A method according to claim 23, wherein the step of forming the tip comprises chemically etching the probe shank.

25. A method according to claim 23, wherein the step of forming the tip comprises etching the probe shank with a focused ion beam (FIB).

26. A method according to claim 23, wherein the tip extends from the distal end of the probe shank in a direction generally parallel to an imaginary line extending perpendicularly from the base.

27. A method according to claim 23, wherein the angle is in a range of 160–175°.

28. A method according to claim 23, wherein the step of connecting the probe shank to the base comprises securing the probe shank with an adhesive.

29. A method according to claim 23, wherein the step of connecting the probe shank to the base comprises connecting the probe shank at an angle offset from perpendicular to the base.

30. A method according to claim 23, wherein the tip has a reduced diameter relative to the probe shank.

31. A method according to claim 23, wherein the base comprises a glass plate.

32. A method of scanning a sample with a scanning probe microscope, the method comprising:
   mounting a probe to the scanning probe microscope, the probe comprising
      a base connected to the scanning probe microscope,
      a shank extending from the base at an angle offset from perpendicular to the base, and
      a tip connected to a distal end of the shank for contacting the sample, the tip being laterally offset from the base to permit viewing of a location of the tip without interference from the shank and the base,
      the shank and the tip being integrally formed as a monolithic unit and comprising an optical fiber;
   positioning the probe relative to the sample while viewing a tip location from above; and
   measuring the sample with the probe.

33. A method according to claim 32, wherein the tip extends from the distal end of the shank at an angle offset from an axis of the shank.

34. A method according to claim 32, wherein the angle is in a range of 5 to 20°.

35. A method according to claim 32, wherein the tip has a reduced diameter relative to the shank.

36. A scanning probe microscope comprising:
   a stage for holding a sample;
   a sensor head adjacent the stage;
   a scanning actuator for positioning the sensor head relative to the sample; and
   a probe carried by the sensor head and comprising
      a base connected to the sensor head,
      a shank extending from the base at an angle offset from perpendicular to the base, and
      a tip connected to a distal end of the shank for contacting the sample, the tip being laterally offset from the base to permit viewing of a tip location without interference from the shank and the base, the tip extending from the distal end of the shank in a direction generally parallel to an imaginary line extending perpendicularly from the base.

37. A scanning probe microscope according to claim 36, wherein the tip extends from the distal end of the shank at an angle offset from an axis of the shank.

38. A scanning probe microscope according to claim 36, wherein the tip has a reduced diameter relative to the shank.

39. A scanning probe microscope comprising:
   a stage for holding a sample;
   a sensor head adjacent the stage;
   a scanning actuator for positioning the sensor head relative to the sample; and
   a probe carried by the sensor head and comprising
      a base, comprising a glass pate, connected to the sensor head,
      a shank extending from the base at an angle offset from perpendicular to the base, and
      a tip connected to a distal end of the shank, and integrally formed as a monolithic unit therewith, for contacting the sample, the tip being laterally offset from the base to permit viewing of a tip location without interference from the shank and the base.

40. A scanning probe microscope according to claim 39, wherein the shank and the tip comprise an optical fiber.

41. A scanning probe microscope according to claim 39, wherein the tip extends from the distal end of the shank in a direction generally parallel to an imaginary line extending perpendicularly from the base.

42. A method of scanning a sample with a scanning probe microscope, the method comprising:

mounting a probe to the scanning probe microscope, the probe comprising a base connected to the scanning probe microscope, a shank extending from the base at an angle offset from perpendicular to the base, and a tip connected to a distal end of the shank for contacting the sample, the tip being laterally offset from the base to permit viewing of a location of the tip without interference from the shank and the base, the tip extending from the distal end of the shank in a direction generally parallel to an imaginary line extending perpendicularly from the base, the shank and the tip being integrally formed as a monolithic unit;

positioning the probe relative to the sample while viewing a tip location from above; and measuring the sample with the probe.

43. A method according to claim 42, wherein the shank and the tip comprise an optical fiber.

* * * * *